United States Patent
Jibbe et al.

(10) Patent No.: US 8,046,631 B2
(45) Date of Patent: Oct. 25, 2011

(54) FIRMWARE RECOVERY IN A RAID CONTROLLER BY USING A DUAL FIRMWARE CONFIGURATION

(75) Inventors: Mahmoud K. Jibbe, Wichita, KS (US); Rajasekaran Jeevanandham, Tiruchirappalli (IN); Uma K, Tamil Nadu (IN)

(73) Assignee: LSI Corporation, Milpitas, CA (US)

( * ) Notice: Subject to any disclaimer, the term of this patent is extended or adjusted under 35 U.S.C. 154(b) by 211 days.

(21) Appl. No.: 12/432,004

(22) Filed: Apr. 29, 2009

(65) Prior Publication Data
US 2010/0281297 A1 Nov. 4, 2010

(51) Int. Cl.
*G06F 11/00* (2006.01)
(52) U.S. Cl. .......................... 714/6.3; 714/6.22; 714/42
(58) Field of Classification Search ................ 714/5, 6, 714/7, 42, 6.22, 6.3
See application file for complete search history.

(56) References Cited

U.S. PATENT DOCUMENTS

| | | | | |
|---|---|---|---|---|
| 5,579,522 A * | 11/1996 | Christeson et al. | ............... | 713/2 |
| 5,793,943 A * | 8/1998 | Noll | ................... | 714/6 |
| 5,835,695 A * | 11/1998 | Noll | ................... | 714/6 |
| 5,870,520 A * | 2/1999 | Lee et al. | ........................... | 714/6 |
| 6,076,142 A * | 6/2000 | Corrington et al. | ........... | 711/114 |
| 6,185,696 B1 * | 2/2001 | Noll | .................................. | 714/6 |
| 6,571,347 B1 * | 5/2003 | Tseng | ................................. | 714/6 |
| 6,665,813 B1 * | 12/2003 | Forsman et al. | ................ | 714/15 |
| 6,757,838 B1 * | 6/2004 | Chaiken et al. | .................... | 714/5 |
| 6,944,758 B2 * | 9/2005 | Lin | .................................... | 713/2 |
| 7,043,664 B1 * | 5/2006 | Chiloyan | .......................... | 714/5 |
| 7,185,191 B2 * | 2/2007 | Bosley et al. | ....................... | 713/2 |
| 7,433,300 B1 * | 10/2008 | Bennett et al. | ................. | 370/216 |
| 7,761,735 B2 * | 7/2010 | Ellsworth et al. | ................. | 714/6 |
| 7,765,393 B1 * | 7/2010 | Lee et al. | ........................... | 713/2 |
| 7,809,886 B2 * | 10/2010 | Ashmore et al. | ............. | 711/114 |
| 7,818,556 B2 * | 10/2010 | Iima et al. | .......................... | 713/1 |
| 7,861,119 B1 * | 12/2010 | Righi et al. | ..................... | 714/38 |
| 2003/0126493 A1 * | 7/2003 | Lee | ................................... | 714/6 |
| 2003/0229775 A1 * | 12/2003 | Schelling | .......................... | 713/1 |
| 2004/0153846 A1 * | 8/2004 | Lee | ................................. | 714/42 |
| 2005/0081090 A1 * | 4/2005 | Lin | .................................... | 714/6 |
| 2006/0015683 A1 * | 1/2006 | Ashmore et al. | ............. | 711/113 |
| 2008/0201616 A1 * | 8/2008 | Ashmore | ......................... | 714/57 |
| 2008/0215915 A1 * | 9/2008 | Zhou et al. | ...................... | 714/15 |
| 2009/0254898 A1 * | 10/2009 | Sareen et al. | ................. | 717/174 |
| 2010/0125752 A1 * | 5/2010 | Chen et al. | ......................... | 714/6 |
| 2010/0199272 A1 * | 8/2010 | Mahajan et al. | .............. | 717/171 |

* cited by examiner

*Primary Examiner* — Robert Beausoliel, Jr.
*Assistant Examiner* — Joshua P Lottich
(74) *Attorney, Agent, or Firm* — Christopher P. Maiorana, PC

(57) ABSTRACT

A system comprising a first memory, a second memory, and a controller. The first memory may be configured to store a first firmware. The second memory may be configured to store a second firmware similar to the first firmware stored on the first memory. The controller may be configured to (i) operate the first firmware stored on the first memory, (ii) discontinue operating the first firmware in response to a failure of the first firmware, and (iii) begin operating the second firmware after discontinuing operation of the first firmware.

18 Claims, 4 Drawing Sheets

FIRMWARE RECOVERY IN A RAID CONTROLLER BY USING A DUAL FIRMWARE CONFIGURATION

FIELD OF THE INVENTION

The present invention relates to controllers generally and, more particularly, to a method and/or apparatus for implementing firmware recovery in a RAID controller by using a dual firmware configuration.

BACKGROUND OF THE INVENTION

Conventional systems implement firmware as an important code to control activities of a RAID controller most of the time. The firmware controls activities such as creating, deleting, modifying and scanning a configuration detail during a boot sequence. If an error occurs during the execution of the firmware (i.e., crashing, code breaking, etc.) a conventional RAID controller will stop functioning properly, and the controller will have down time. During such down time, an end user will be unable to access data from the storage device. The RAID controller will need to be updated (or flashed) with the firmware on the same RAID controller in the case of firmware failure. The RAID controller will need to be replaced in the case of a firmware flash chip failure.

RAID controllers are used in several locations including mission critical/scientific computation, banking, data storage and computation, the educational sector, etc. The implementation of a RAID controller depends upon end user requirements and configuration of the RAID controller based on high throughput and/or redundancy. A combination of the end user requirements and configuration of the RAID controller also determines whether a RAID controller is implemented. Currently, if the firmware of the controller becomes corrupted, a greater downtime will result to the end user regardless of the application and configuration of the RAID controller. This situation can be handled either by upgrading the firmware in the faulty RAID controller or by changing in a new RAID controller. The upgrading or changing of the RAID controller will result in more down time at the customer end.

Disadvantages of conventional approaches include (i) greater down time when the firmware crashes and/or the firmware flash chip fails, (ii) if the firmware fails then a field engineer (or customer) has to update the firmware, (iii) the need to spend money to replace the RAID controller in the case of a firmware flash chip failure, (iv) operation being halted in terms of days (i.e., at least a partial day) in the case of firmware crash and/or firmware flash chip failure, (v) if power failure happens while firmware flashing, then the controller may not work, and/or (vi) a mandatory physical dealing in the system and RAID controller in case of firmware crash and/or firmware flash chip failure.

It would be desirable to implement a method and/or apparatus for implementing firmware recovery in a RAID controller by using a dual firmware implementation.

SUMMARY OF THE INVENTION

The present invention concerns a system comprising a first memory, a second memory, and a controller. The first memory may be configured to store a first firmware. The second memory may be configured to store a second firmware similar to the first firmware stored on the first memory. The controller may be configured to (i) operate the first firmware stored on the first memory, (ii) discontinue operating the first firmware in response to a failure of the first firmware, and (iii) begin operating the second firmware after discontinuing operation of the first firmware.

The objects, features and advantages of the present invention include providing a method and/or apparatus for implementing firmware recovery in a RAID controller that may (i) implement a dual firmware implementation, (ii) reduce down time from number of days into number of seconds, (iii) in the case of firmware crash and/or firmware flash chip failure, reduce or eliminate the need to replace the RAID controller, (iv) in the case of firmware crash and/or firmware chip failure, provide a mechanism with a dual firmware flash chip in the RAID controller that will switch over the control to a secondary flash chip from a primary flash chip with or without a system reboot, (v) in the case of firmware crash and/or firmware chip failure, reduce or eliminate the need for physical dealings in the RAID controller (e.g., position, replacement, etc.), (vi) provide firmware level redundancy in both the firmware and the chip level to improve Mean Time Between Failure (MTBF) for the RAID controller, and/or (vii) restore the operation of the RAID controller from at least the secondary flash chip when a power failure occurs while flashing the firmware.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
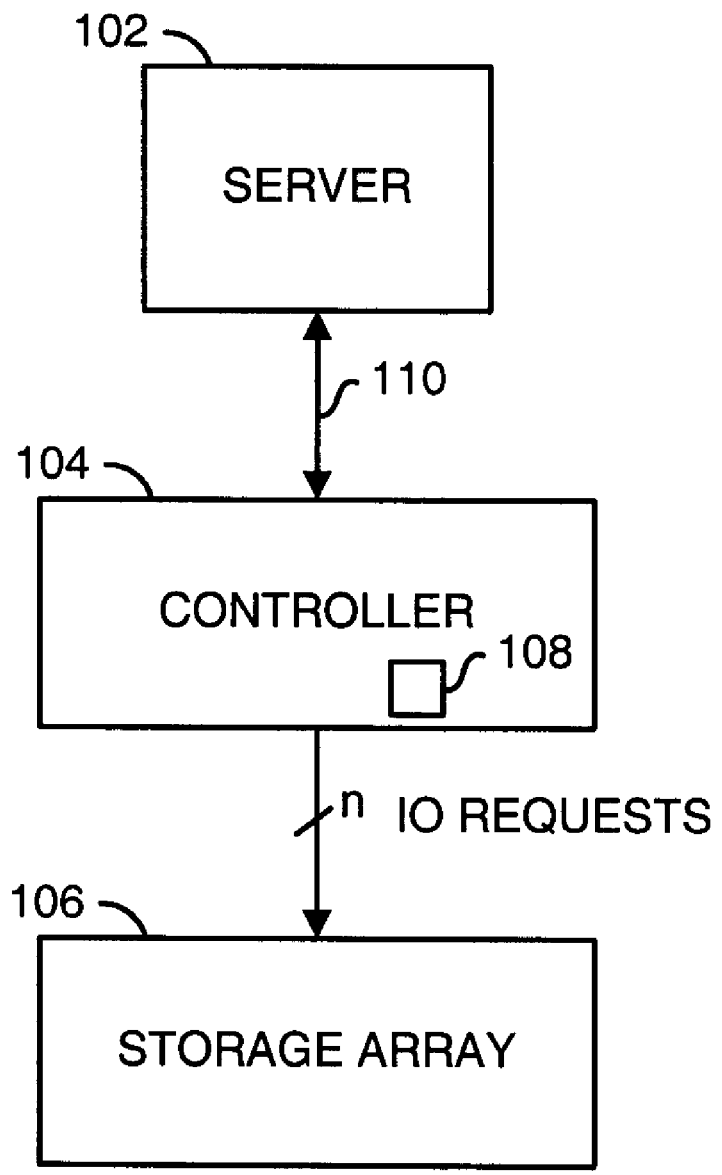
FIG. 1 is a block diagram of an example embodiment of the present invention.

Referring to FIG. 1, a block diagram of a system 100 is shown in accordance with a preferred embodiment of the present invention. The system 100 generally comprises a module 102, a module 104, a module 106, a module 108 and a connection 110. The module 102 may be implemented as a server. The module 104 may be implemented as a controller. In one example, the module 104 may be implemented as a RAID controller. The module 106 may be implemented as a storage array. For example, the module 106 may represent an array of disk drives or other storage devices (e.g., solid state storage, etc.). The RAID controller 104 may include the module 108. The module 108 may be configured to store software, or compute code (e.g., firmware). For example, the module 108 may be implemented as a memory, storage device, etc. configured to store firmware. In one example, the module 108 may be implemented to store two sets of firmware. The module 108 may implement two storage areas (e.g., one for each set of firmware). In another example, the module 108 may be implemented as two or more discrete storage devices. The module 108 may be implemented as a fixed storage device, a removable storage device, or a combination of fixed and removable storage devices. The connection 110 may be implemented as a network connection. In one example, the network connection 110 may be implemented as a fiber channel network, or other type of network.

Figure 2:
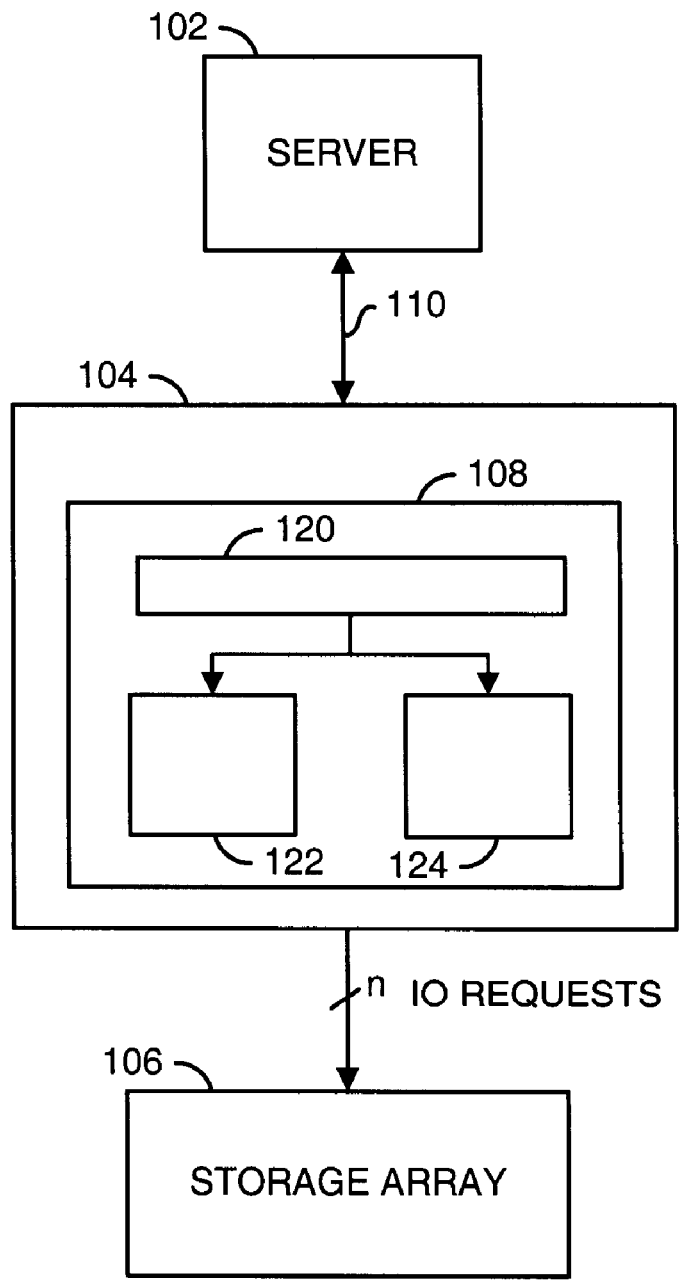
FIG. 2 is a more detailed block diagram of an embodiment of the present invention.

Referring to FIG. 2, a more detailed block diagram of the system 100 is shown. The dual firmware module 108 generally comprises a module 120, a module 122, and a module 124. The module 120 may be implemented as a controller. In one example, the module 120 may be implemented as a processor-like controller. The module 122 may be implemented as a memory. In one example, the module 122 may be implemented as a flash memory. The module 124 may be implemented as a memory. In one example, the module 124 may be implemented as a flash memory. The flash memory 122 may store a firmware (e.g., a primary firmware). The flash memory 124 may store a second set of software, or computer code (e.g., a secondary firmware).

The dual firmware module 108 may be implemented as part of the RAID controller 104. The dual firmware module 108 may implement the controller 120 with the flash memory 122 and the flash memory 124. For example, the flash memory 122 may store the firmware in two separate locations (e.g., see FIG. 4). By having two separate flash memories (e.g., the flash memory 122 and the flash memory 124) or two separate locations may allow the system 100 to store firmware in two different places. In one example, two different versions of the firmware may be stored by the system 100 in two different places. The primary firmware and the secondary firmware may be upgradeable (e.g., with a new software version). In one example, the secondary firmware may be upgraded while the primary firmware is in use by the RAID controller 104.

The controller 120 may operate the primary firmware stored on the flash memory 122. For example, the primary firmware from the flash memory 122 may control the RAID controller 104. If the primary firmware has a failure, then the controller 120 may discontinue operating the primary firmware. The controller 120 may then begin to operate the secondary firmware stored on the memory 124 after discontinuing the primary firmware. For example, if the primary firmware crashes (or becomes corrupt and/or otherwise non-functioning), or the flash memory 122 fails, then the controller 120 may switch to the secondary firmware stored in the flash memory 124 with or without rebooting the system 100. Before a reboot, the dual firmware module 108 may save a recent read/write operation (or operations) detail in a NVRAM of the RAID controller 104.

In one example, if the primary firmware becomes corrupt and/or the flash memory 122 fails, then the dual firmware module 108 may save a recent read/write operation (or operations) in the RAID controller 104 (e.g., a cache). The primary firmware may crash for a variety of reasons. For example, the primary firmware may crash as a result of being overwritten by a user data. One such example may occur if the firmware updates a stored region improperly. When the controller 120 processes a system reboot (or reset), the controller 120 may attempt to download a corrupted code from the flash memory 122 (or flash memory 124) resulting in a failure. In another example, the primary firmware may crash in response to external forces (e.g., the flash memory 122 may overheat, may be subjected to environmental forces such as being dropped, etc.). Some errors (e.g., hard errors) may be fixed by switching from the flash memory 122 to the flash memory 124. Such hard errors may include manufacturing defects where a particular memory cell is unable to store a desired value (e.g., is stuck). Another example of a hard error may occur where one or more cells are close to specifications when initially implemented, but the one or more cells may move (e.g., migrate) to a state not within the specifications after being installed. Some errors (e.g., soft errors) may be fixed by a reboot or a reprogramming. An example of a soft error may occur when something environmental (e.g., a cooling problem in a server environment) occurs.

The dual firmware module 108 may perform one or more operations after a reboot. In one example, the dual firmware module 108 may diagnose the flash memory 122 to determine the cause of the failure. If the failure was due to a corruption in the flash memory 122, then the controller 120 may copy the secondary firmware from the flash memory 124 to the flash memory 122. The controller 120 may also save a dump of the primary firmware for a user to investigate. If the failure was due to the primary firmware crashing (e.g., a soft error, etc.), then the dual firmware module 108 may try to fix the crash (e.g., the soft error) and copy the secondary firmware from the flash memory 124 to the flash memory 122.

If the dual firmware module 108 is unable to fix the soft error, then the dual firmware module 108 may send a message to the user (e.g., "Primary flash failed permanently and there will be no redundancy in this RAID controller"). The dual firmware module 108 may continue scanning the drive configuration by using the secondary firmware from the flash memory 124. If the dual firmware module 108 diagnoses the flash memory 122 with a failure (e.g., a hard error), then the dual firmware module 108 may send a message to the user (e.g., "Primary flash failed permanently and there will be no redundancy in this RAID controller"). For example, the flash memory 122 may fail in response to a manufacturing defect (e.g., bad cells, migration, etc.). The dual firmware module 108 may continue scanning the drive configuration by using the secondary firmware from the flash memory 124.

Figure 3:
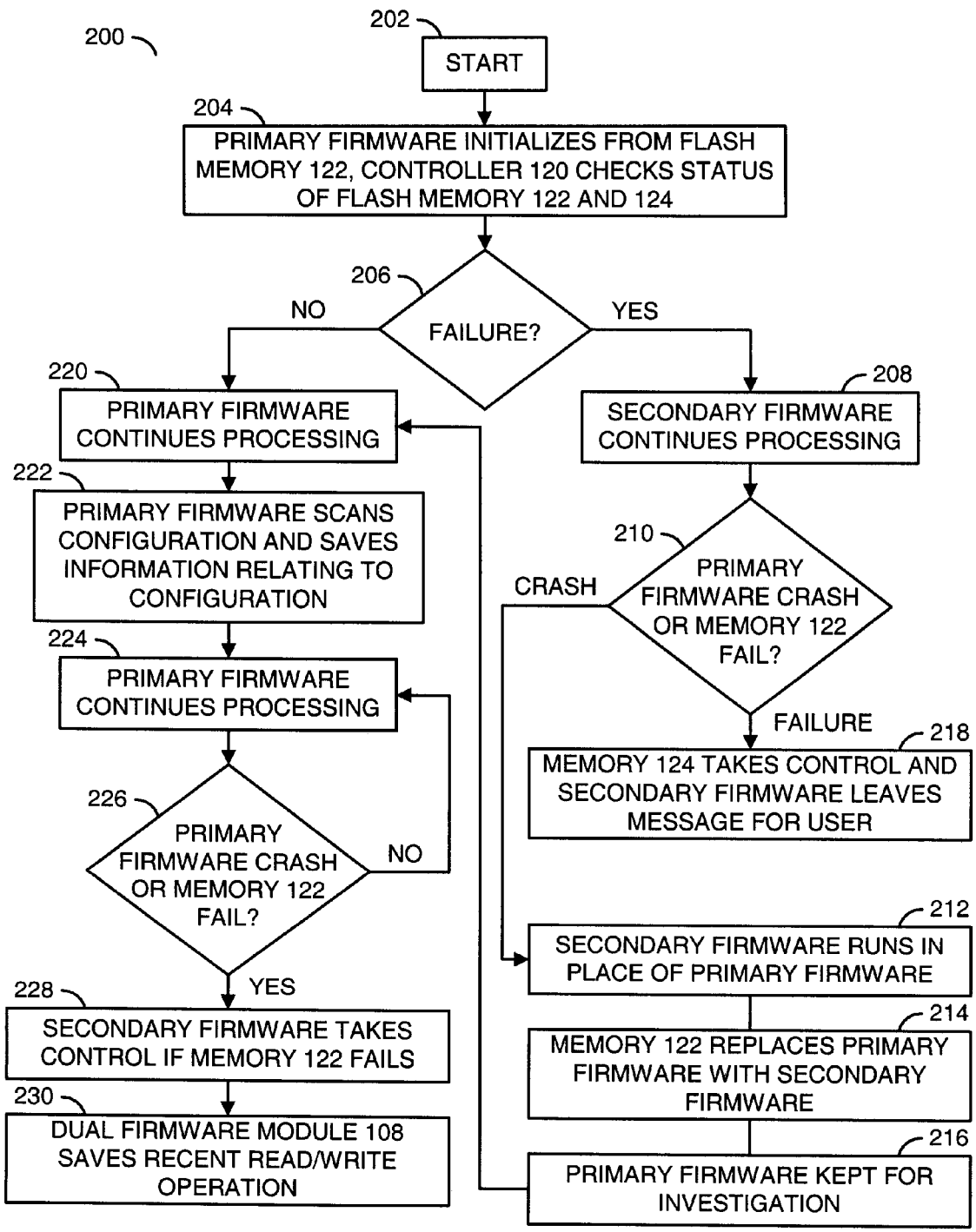
FIG. 3 is a flow diagram illustrating an example embodiment of the present invention.

Referring to FIG. 3, a flow diagram of a process 200 is shown. The process (or method) 200 generally comprises a state 202, a state 204, a decision state 206, a state 208, a decision state 210, a state 212, a state 214, a state 216, a state 218, a state 220, a state 222, a state 224, a decision state 226, a state 228, and a state 230. In the state 202, the process 200 may start. In the state 204, the primary firmware may initialize from the flash memory 122 and the controller 120 may check the status of the flash memory 122 and the flash memory 124. The controller 120 may also check a reliability of the primary firmware. In one example, the controller 120 may check a reliability of the secondary firmware. In the decision state 206, the process 200 may determine if the primary firmware or the flash memory 122 has failed. If not, the process 200 may move to the state 220. If so, the process 200 may move to the state 208. In the state 208, the secondary firmware stored on the flash memory 124 may take care of the rest of the processes in a case of one of the flash memories 122 or 124 failing, resulting in minimal (e.g., 1-2 mins) down time. In another example, the secondary firmware may take care of the rest of the processes in a case of the primary firmware crashing, resulting in minimal (e.g., 4-5 mins) down time.

The process 200 may initialize the secondary firmware in the decision state 210. In the decision state 210, the process 200 may determine if the failure was a firmware crash (e.g., of the primary firmware) or a failure of the flash memory 122. If the failure was due to the primary firmware crashing, the process 200 may move to the state 212. In the state 212, the secondary firmware may be run in place of the primary firmware. Such a substitution may fix the operation of the controller 104. In the state 214, the primary firmware stored on the flash memory 122 may be replaced with the secondary firmware stored on the flash memory 124. In the state 216, the primary firmware may be kept for further investigation and the flash memory 122 may take back control once the primary firmware passes an integrity test. In one example, any form of information (e.g., a crash dump) may be stored for further investigation. If the failure was due to a failure of the flash memory 122, the process 200 may move to the state 218. In the state 218, the flash memory 124 may take control (e.g., permanently) and the secondary firmware may leave a message for a user (e.g., "No more firmware redundancy").

In the state 220, the primary firmware may continue processing. In the state 222, the primary firmware stored on the flash memory 122 may scan a configuration and save information relating to the configuration. In the state 224, the dual firmware module 108 may periodically check for a firmware crash or a failure of the flash memory 122. The primary firmware may continue processing in the state 224. In the decision state 226, the process 200 may determine if there is a firmware crash or failure of the flash memory 122. If not, the process 200 may return to the state 224. If so, the process 200 may move to the state 228. In the state 228, the secondary firmware stored on the flash memory 124 may take control with (or without) a reboot if the memory 122 fails (or the primary firmware crashes). In the state 230, the dual firmware module 108 may save a recent read/write operation in a NVRAM of the RAID controller 104.

Figure 4:
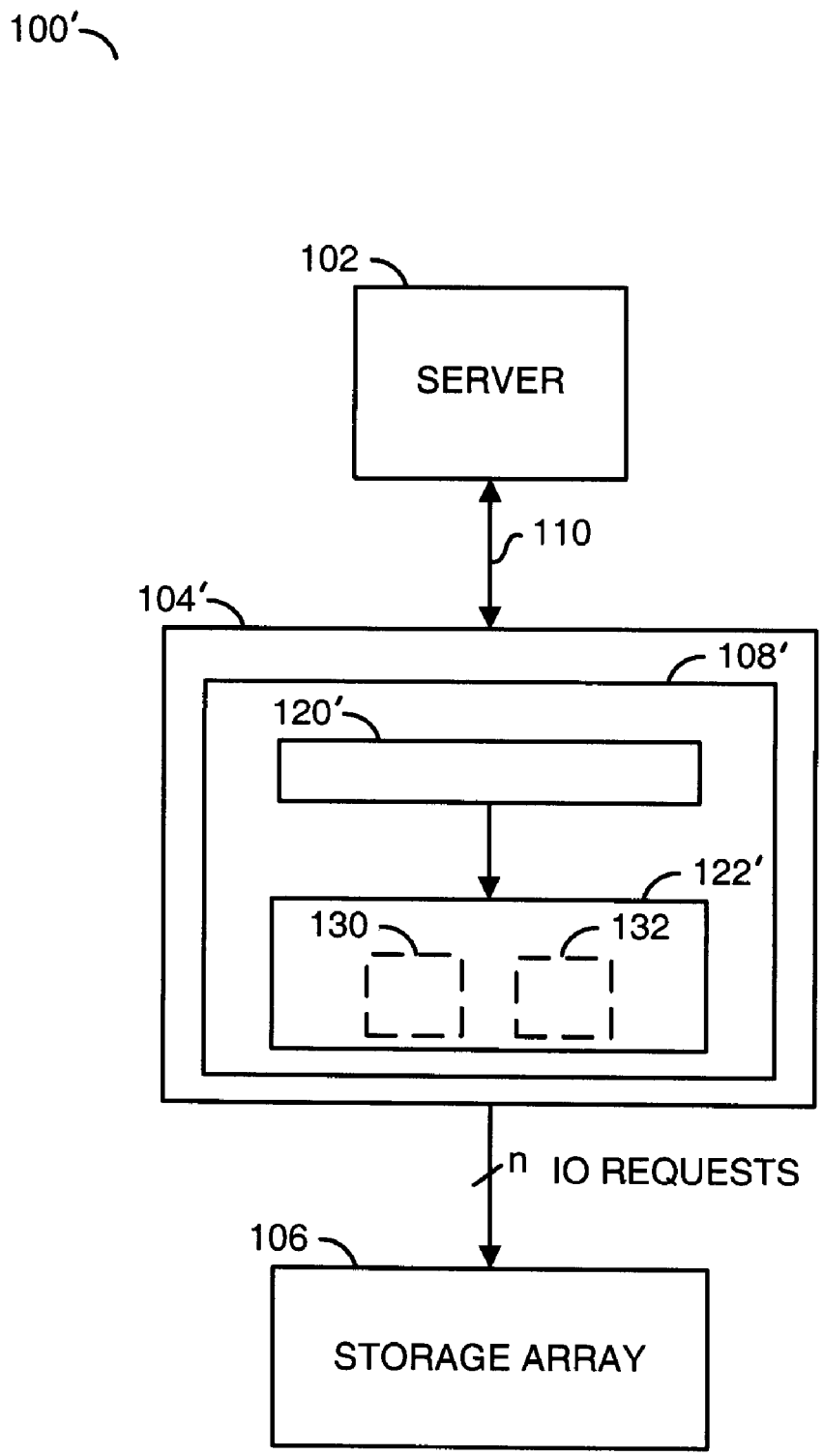
FIG. 4 is a more detailed diagram of another embodiment of the present invention.

Referring to FIG. 4, a block diagram of a system 100' is shown. The system 100' generally comprises the server 102, a module 104', the storage array 106, and a module 108'. The module 104' may be implemented as a controller. In one example, the module 104' may be implemented as a RAID controller. The RAID controller 104' may include the module 108'. The module 108' may be implemented as software, or computer code (e.g., firmware). In one example, the module 108' may be implemented in a single memory configuration. The module 108' may include a module 120' and a module 122'. The module 120' may be implemented as a controller. In one example, the module 120' may be implemented as a processor like controller. The module 122' may be implemented as a memory. In one example, the module 122' may be implemented as a flash memory. The flash memory 122' may include a location 130 and a location 132. The location 130 may be implemented as a primary location. The location 132 may be implemented as a secondary location. A firmware (e.g., a primary firmware) may be stored at the primary location 130 of the flash memory 122'. A second set of software, or computer code (e.g., a secondary firmware) may be stored at the secondary location 132 of the flash memory 122'.

The module 108' may be implemented on the RAID controller 104'. The module 108' may comprise the flash memory 122' and the controller 120. The flash memory 122' may include the primary location 130 and the secondary location 132. The controller 120' may monitor the flash memory 122'. The controller 120' may switch control between the primary firmware stored at the primary location 130 and the secondary firmware stored at the secondary location 132. For example, if the primary firmware stored at the primary location 130 fails then the controller 120' may switch control of the RAID controller 104' to the secondary firmware stored in the secondary location 132. In one example, the system 100' may reboot when the module 108' switches between the primary firmware and the secondary firmware.

The dual firmware module 108 (or the module 108') may be implemented in an internal RAID controller and an external RAID controller independent of an interface (e.g., SCSI, SATA, SAS, FC, etc.). For example, a user may prefer a RAID controller (e.g., implemented in mission-critical, data sensitive, scientific, core-banking, etc.) implemented with firmware recovery with little user intervention. The RAID controller implemented with the dual firmware configuration may replace two RAID controllers. The RAID controller implemented with the dual firmware configuration may reduce space (e.g., number of slots occupied) and cost.

The functions performed by the diagram of FIG. 3 may be implemented using one or more of a conventional general purpose processor, digital computer, microprocessor, microcontroller, RISC (reduced instruction set computer) processor, CISC (complex instruction set computer) processor, SMID (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products) or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (electronically programmable ROMs), EEPROMs (electronically erasable ROMs), UVPROM (ultra-violet erasable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, storage and/or playback devices, video recording, storage and/or playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the scope of the invention.

The invention claimed is:

1. A system comprising:
   a first memory configured to store a first firmware;
   a second memory configured to store a second firmware similar to said first firmware stored on said first memory; and
   a controller configured to (i) operate said first firmware stored on said first memory, (ii) discontinue operating said first firmware in response to a failure of said first firmware, and (iii) begin operating said second firmware after discontinuing operation of said first firmware, wherein (A) one or more recent read/write operations are saved in said controller prior to switching from said first firmware to said second firmware and (B) said first memory and said second memory are located on said controller.

2. The system according to claim 1, wherein said first memory and said second memory each comprise a flash memory.

3. The system according to claim 1, wherein (i) said failure comprises said first memory failing and (ii) said controller diagnoses said first memory to determine a cause of said failure.

4. The system according to claim 1, wherein said failure comprises said first firmware crashing.

5. The system according to claim 4, wherein said controller (i) tries to fix said failure and (ii) copies said second firmware to said first memory in response to said first firmware crashing for a user to investigate.

6. The system according to claim 1, wherein said second firmware is different than said first firmware.

7. The system according to claim 1, wherein said first firmware is implemented by a RAID controller.

8. The system according to claim 1, wherein said first memory and said second memory are separately accessible to allow said system to store said first firmware and said second firmware in two different locations.

9. The system according to claim 1, wherein said first memory is removable.

10. The system according to claim 1, wherein said second memory is removable.

11. The system according to claim 1, wherein (i) said first firmware and said second firmware are upgradeable and (ii) said second firmware is upgraded while said first firmware is in use by said controller.

12. The apparatus according to claim 1, wherein said failure of said first firmware is a result of a failure of said first memory.

13. The apparatus according to claim 1, wherein said failure of said first firmware is a result of a failure to initialize said first firmware.

14. A system comprising:
   means for storing a first firmware;
   means for storing a second firmware similar to said first firmware;
   means for operating said first firmware and said second firmware;
   means for discontinuing operation of said first firmware in response to a failure of said first firmware; and
   means for beginning operation of said second firmware after discontinuing operation of said first firmware, wherein (A) one or more recent read/write operations are saved prior to switching from said first firmware to said second firmware and (B) said means for storing said first firmware and said means for storing said second firmware are located on said means for operating said first firmware and said second firmware.

15. A method comprising the steps of:
   (A) storing a first firmware in a first memory located on a controller;
   (B) storing a second firmware similar to said first firmware in a second memory located on said controller;
   (C) operating said first firmware and said second firmware using said controller;
   (D) discontinuing operation of said first firmware in response to a failure of said first firmware; and
   (E) beginning operation of said second firmware after discontinuing operation of said first firmware, wherein one or more recent read/write operations are saved in said controller prior to switching from said first firmware to said second firmware.

16. The method according to claim 15, wherein said first memory and said second memory each comprise a flash memory.

17. The method according to claim 15, wherein (i) said failure comprises said first memory failing and (ii) said controller diagnoses said first memory to determine a cause of said failure.

18. The method according to claim 15, wherein said failure comprises said first firmware crashing.

* * * * *